United States Patent [19]
Shortt et al.

[11] Patent Number: 5,694,288
[45] Date of Patent: Dec. 2, 1997

[54] MOUNTING ARRANGEMENT FOR MOUNTING A CIRCUIT BREAKER TO A RAIL

[75] Inventors: James Joseph Shortt, Galway; Shay Joseph Lavelle, Westport, both of Ireland

[73] Assignee: Square D Company, Palatine, Ill.

[21] Appl. No.: 594,555

[22] Filed: Jan. 31, 1996

[30] Foreign Application Priority Data

Feb. 1, 1995 [IE] Ireland ........................... 950079

[51] Int. Cl.⁶ .................................................. H02B 1/04
[52] U.S. Cl. .................... 361/673; 200/294; 361/652; 439/716
[58] Field of Search ........................ 439/622, 716, 439/94, 110; 248/27.1, 27.3; 361/615, 622, 652, 673, 724–728, 823, 825, 807, 809; 200/293, 294, 296, 50.01

[56] References Cited

U.S. PATENT DOCUMENTS

| 4,018,413 | 4/1977 | Bauer | 248/214 |
| 4,966,561 | 10/1990 | Norden | 439/622 |
| 5,297,002 | 3/1994 | Flohr | 361/652 |

FOREIGN PATENT DOCUMENTS

| 2810071 | 9/1979 | Germany | 361/673 |
| 3544363 | 6/1987 | Germany | 361/673 |
| 2230901 | 10/1990 | United Kingdom | 361/673 |

*Primary Examiner*—Gerald P. Tolin
*Attorney, Agent, or Firm*—Larry I. Golden; Kareem M. Irfan; Wayne H. Stoppelmoor

[57] ABSTRACT

A circuit breaker (1) mountable on a channel section rail (8) with a pair of elongate flanges (9, 10) and secured in position by a mounting clip (17) mounted in an elongate groove (18). The mounting clip (17) is movable along the groove (18) from a disengaged position to an operating rail engaging position with a release head portion (23) of the mounting clip (17) being within the outer boundary of the circuit breaker housing (2).

18 Claims, 9 Drawing Sheets

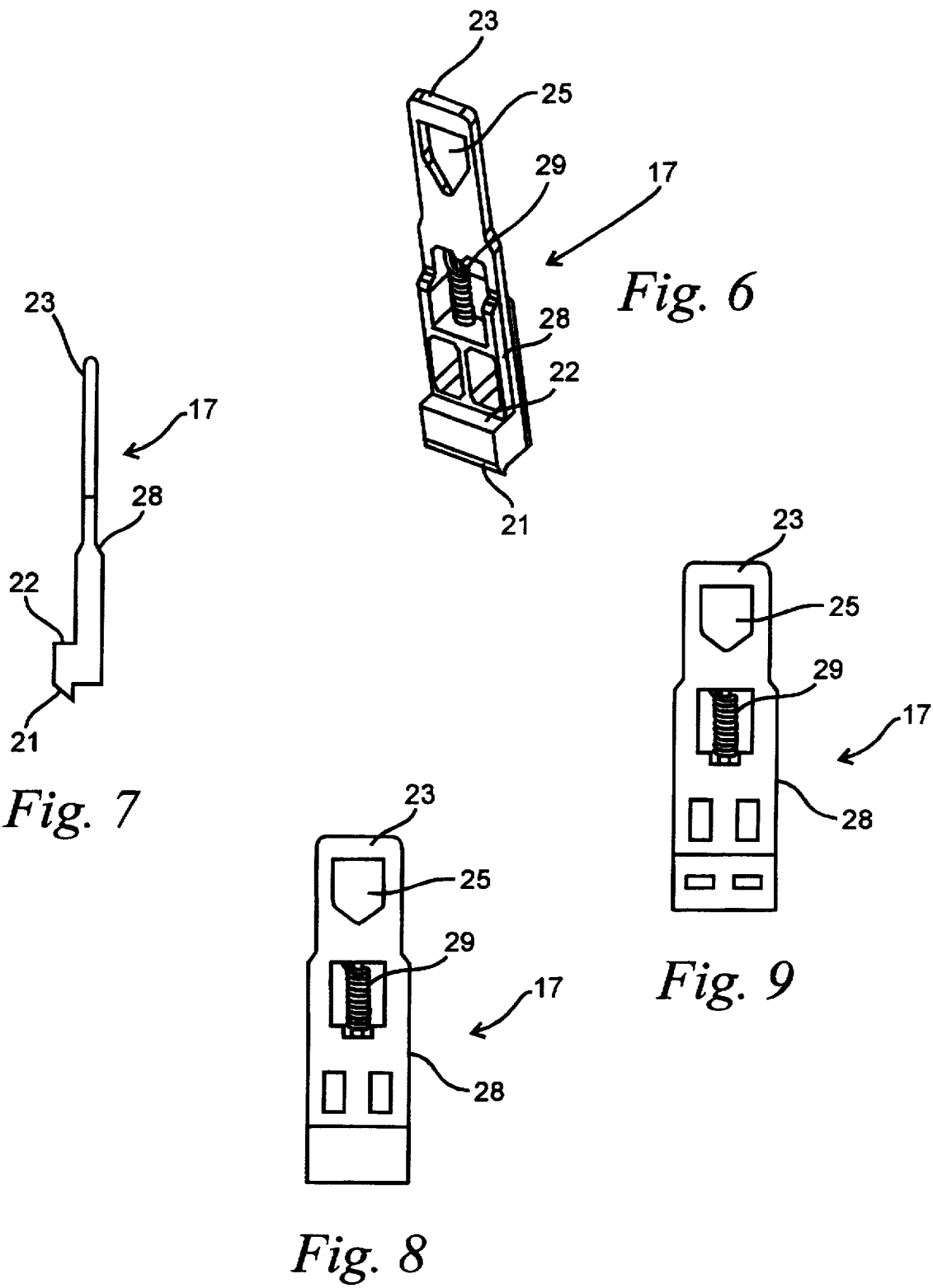

MOUNTING ARRANGEMENT FOR MOUNTING A CIRCUIT BREAKER TO A RAIL

FIELD OF THE INVENTION

The invention relates to a circuit breaker of the type including a housing having a front wall, a rear mounting wall, a pair of side walls and a pair of end walls extending between the front and rear walls to define an outer boundary, the housing having a guide means adjacent the rear wall, the rear wall having at least one fastening recess for mounting on a rail, a mounting clip mounted in the guide means, the mounting clip having a rail engaging portion extending into a fastening recess and a release head portion for disengaging the clip from the rail, the mounting clip being movable into and out of the fastening recess from an operating position with the rail engaging portion engaged with the rail to a disengaged position, wherein, in the operating position, the release head portion of the mounting clip is located within the outer boundary defined by the circuit breaker housing.

BACKGROUND OF THE INVENTION

Circuit breakers of this type are known. The mounting clips of such breakers are however prone to accidental operation or damage and are difficult to assemble.

SUMMARY OF THE INVENTION

According to the invention, when in the operating position, the release head portion of the mounting clip is located within the boundary defined by the circuit breaker housing.

Preferably the release head portion of the mounting clip in the disengaged position projects outside release head portion of the boundary of the circuit breaker housing. This ensures that it is immediately apparent to an operator when the circuit breaker has been disengaged.

In one arrangement the guide means is an elongate groove adjacent the rear mounting face.

Preferably the groove is defined by a pair of spaced apart guide walls of the circuit breaker housing. Thus, the mounting clip is held in position without the need for extra components.

Ideally one guide wall is provided by a guide portion the rear mounting wall of the circuit breaker housing.

In a preferred embodiment the guide portion of the mounting wall has a cut away portion to facilitate handling of the circuit breaker and insertion of the mounting clip, in assembly thereby ensuring that the mounting clip is relatively easy to locate during assembly. Additionally the cut-away portion ensures that the mounting wall is less prone to accidental damage during the assembly process.

Preferably the mounting clip includes a biasing section having biasing means for biasing the rail engaging portion into a normal rail engaging operating position.

Preferably the biasing means is a spring, especially a coil spring.

Ideally the mounting clip has limiting means for limiting movement of the mounting clip to ensure that the mounting clip cannot be removed from the circuit breaker housing.

In a particularly preferred embodiment the circuit breaker has an additional mounting means. Advantageously, this allows the circuit breaker to be adapted for mounting on either a rail or a panel.

Preferably the additional mounting means is provided by at least one mounting bracket ensuring that the additional mounting means is provided in an relatively simple way.

In one arrangement the mounting bracket has a screw retaining mounting head for mounting the bracket and a pair of spaced-apart engagement legs for demountably engaging the circuit breaker housing. This ensures that the circuit breaker remains securely mounted once in position. Preferably the circuit breaker housing has at least one pair of mounting recesses formed for receiving the engagement legs.

Ideally the circuit breaker housing has a pair of mounting recesses adjacent each end wall. The location of a mounting bracket at each end positions the circuit breaker in between ensures that it is securely held.

OBJECTS OF THE INVENTION

The present invention is directed towards a circuit breaker having the advantage that the mounting clip is recessed within the circuit breaker in the normal operating position thus eliminating the risk of accidental damage. This also reduces the possibility of accidental disengagement of the circuit breaker from the mounting rail.

These and other features, advantages and objectives of the invention will be more clearly understood from the following description thereof, given by way of example only with reference to the accompanying drawings.

BRIEF DESCRIPTION OF THE DRAWINGS

FIG. 6 is a perspective view of a mounting clip of the circuit breaker;

FIG. 7 is an end view of the mounting clip of FIG. 6;

FIG. 8 is a side view of the mounting clip of FIG. 6 from one side;

FIG. 9 is a side view of the mounting clip of FIG. 6 from the other side;

DETAILED DESCRIPTION OF THE PREFERRED EMBODIMENTS

Figure 1:
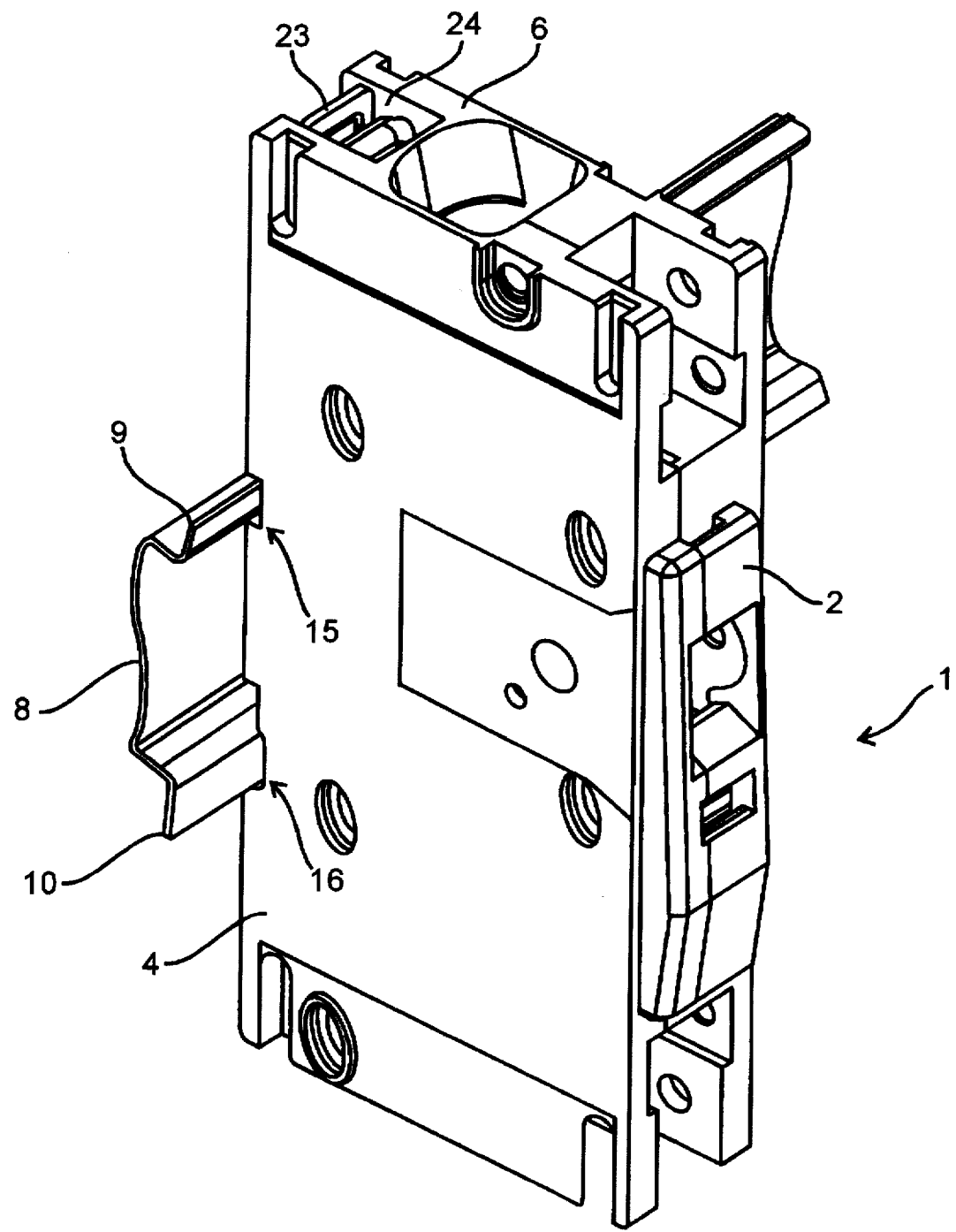
FIG. 1 is a perspective view from one side of a circuit breaker according to the invention in an engaged position on a rail.
Figure 2:
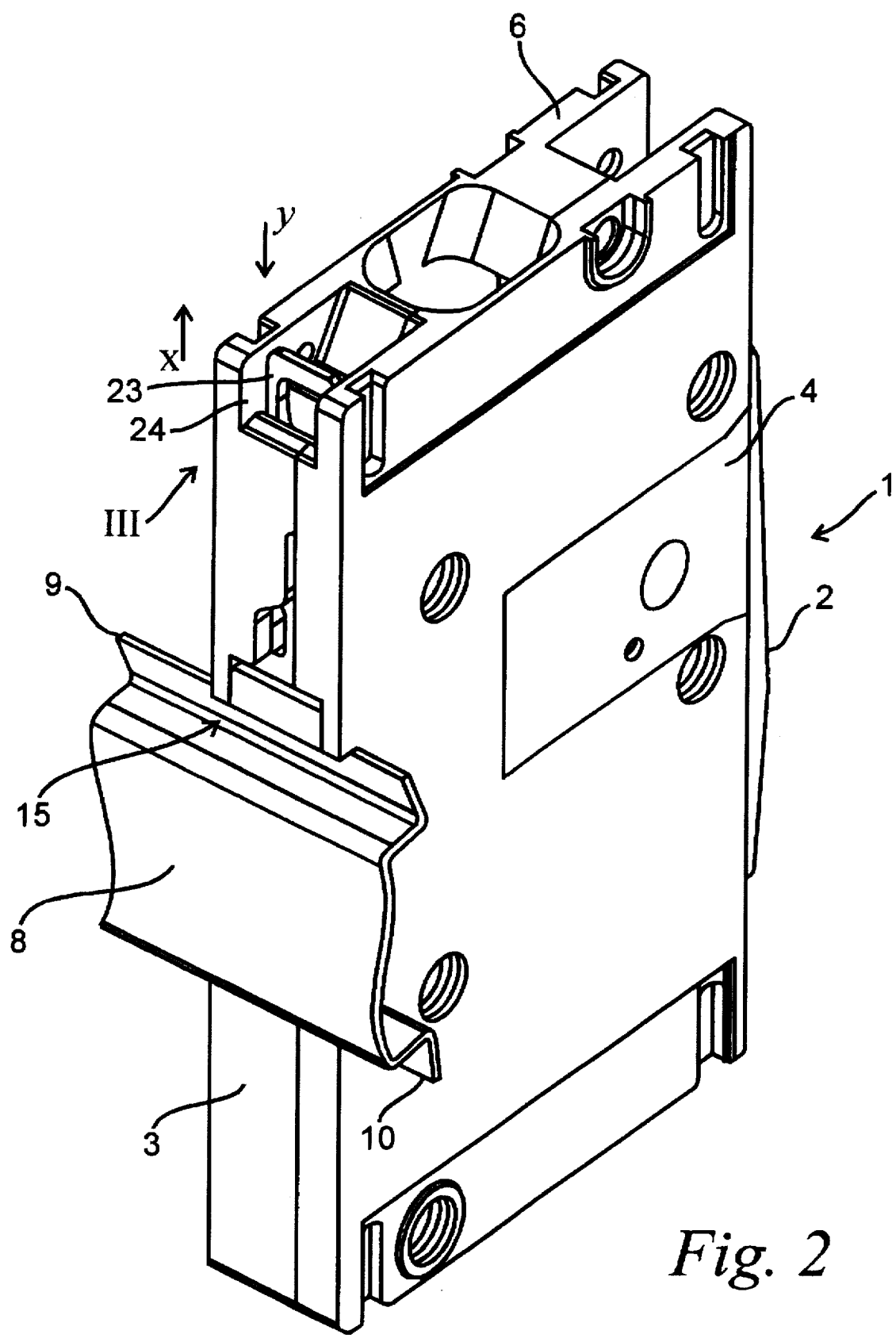
FIG. 2 is a perspective view from the rear of the circuit breaker of FIG. 1.

Referring to the drawings, there is illustrated a circuit breaker according to the invention indicated generally by the reference numeral 1. The circuit breaker 1 includes a housing having a front wall 2, a rear mounting wall 3, two side walls 4,5 and two end walls 6,7 extending between the front and rear walls 2,3. The circuit breaker 1 is mounted on a generally channel section rail 8, having a pair of elongate flanges 9, 10.

In more detail, in this case the rear mounting wall 3 has a pair of spaced apart fastening recesses 15,16 for releasably engaging the flanges 9,10 of the rail 8.

Figure 3:
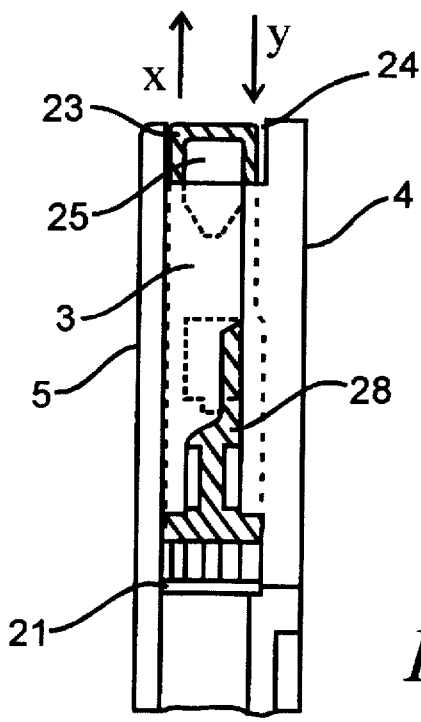
FIG. 3 is a view of the circuit breaker of FIG. 2 in the direction of the arrow III with a mounting clip of the circuit breaker in an engaged position.
Figure 4:
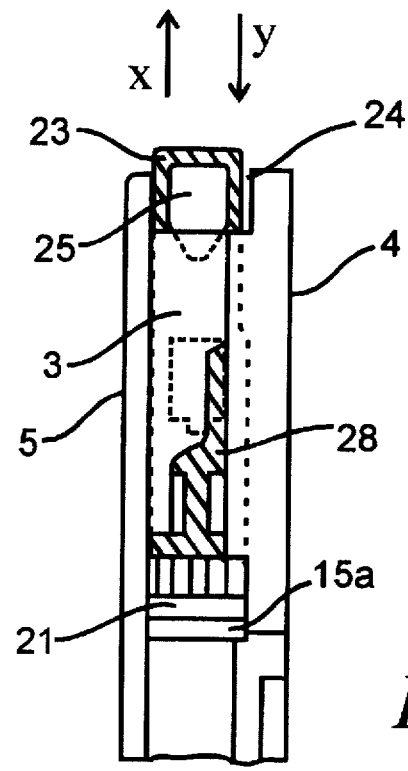
FIG. 4 is a view similar to FIG. 3 with the mounting clip in a disengaged position.
Figure 5:
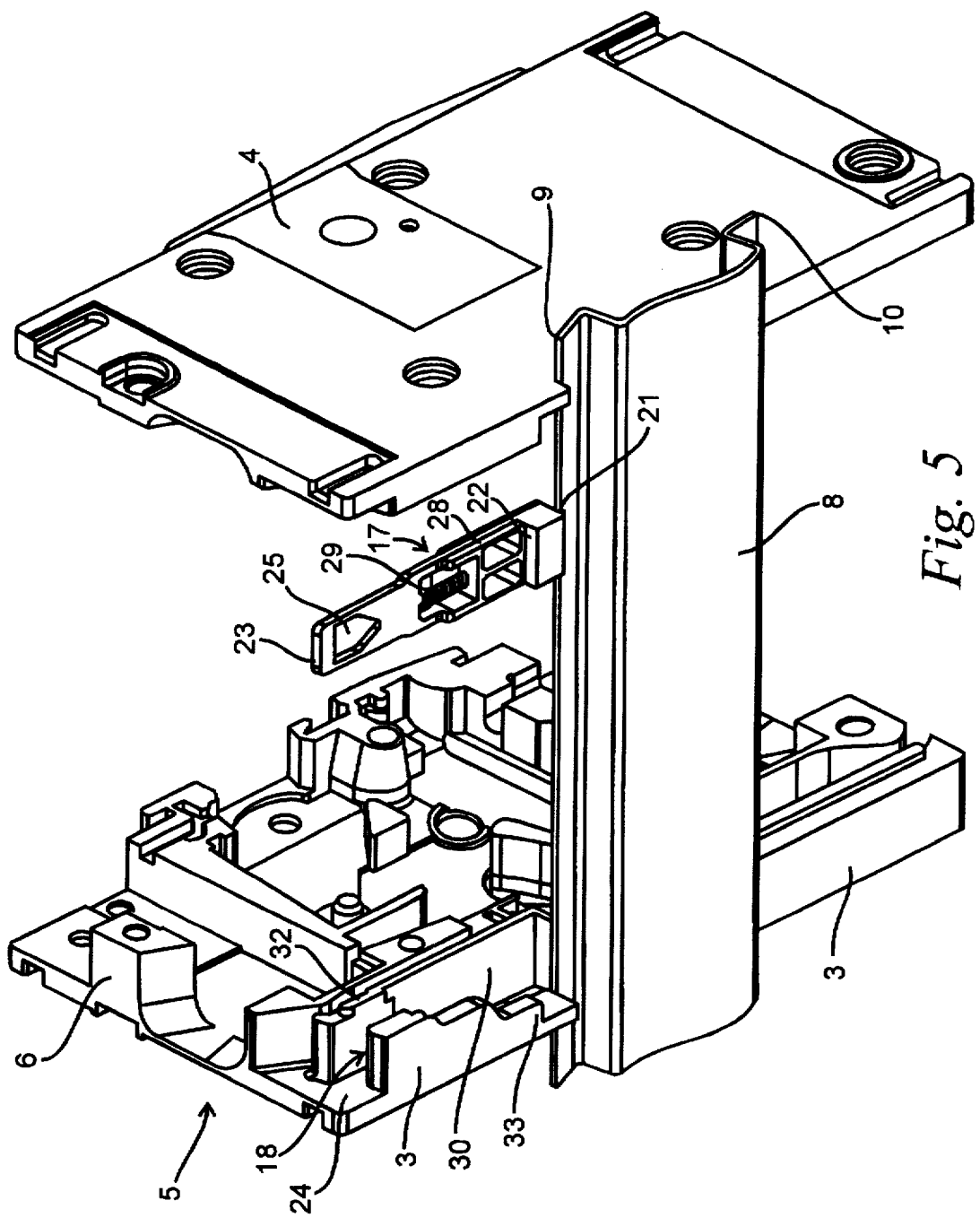
FIG. 5 is an exploded view of the circuit breaker.
Figure 10:
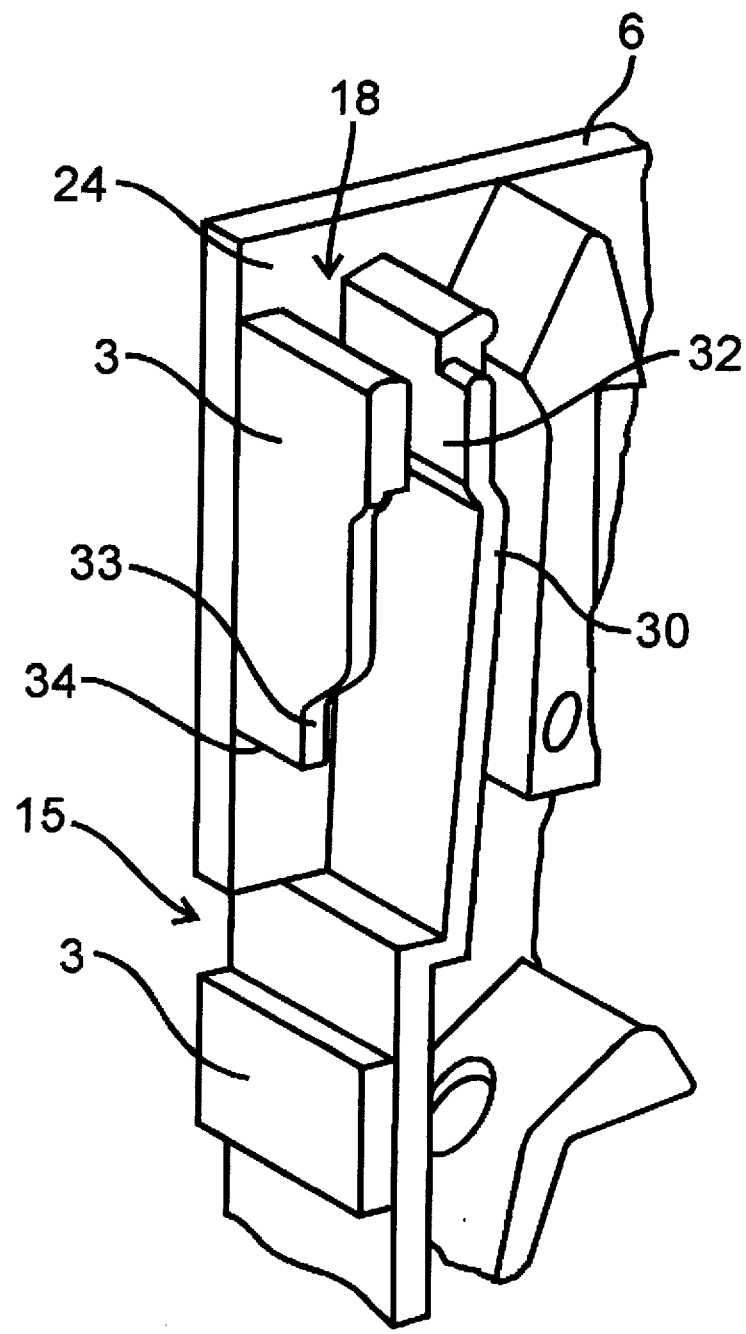
FIG. 10 is a perspective view of a guide groove forming part of the circuit breaker according to the invention.
Figure 11:
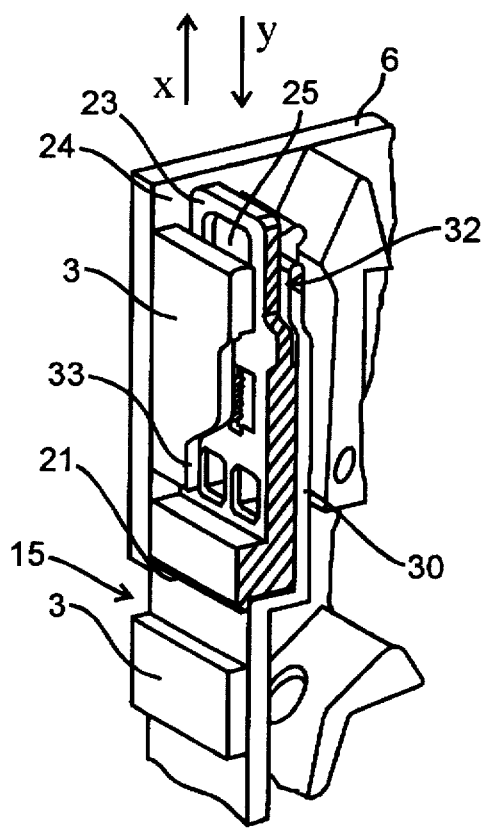
FIG. 11 is a perspective view of the mounting clip of FIGS. 6 to 9 in position within the guide groove of FIG. 10 in the engaged position.
Figure 13:
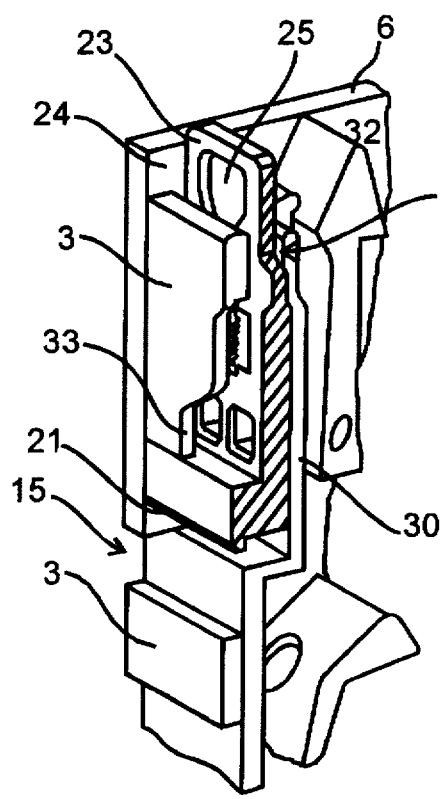
FIG. 13 is a perspective view of the mounting clip in the disengagement position.
Figure 12:
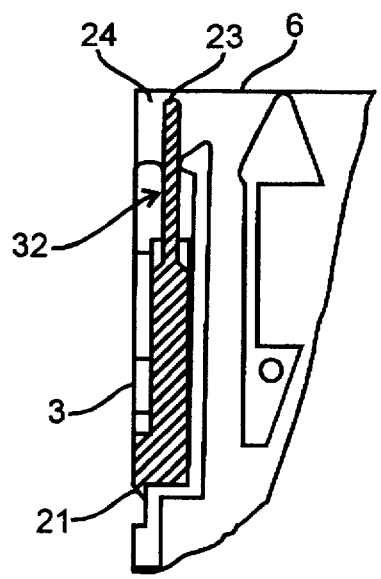
FIG. 12 is a plan view of the mounting clip and circuit breaker in the engaged position of FIG. 11.
Figure 14:
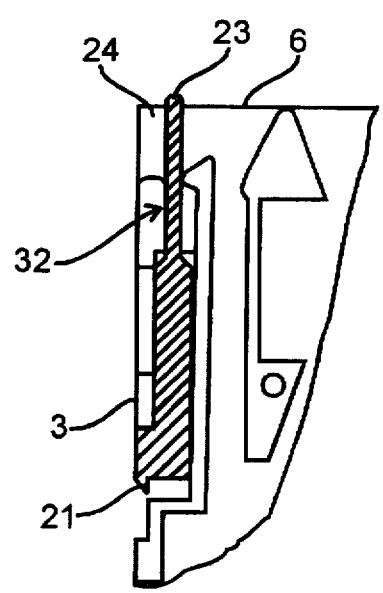
FIG. 14 is a plan view of the mounting clip and circuit breaker in the disengaged position of FIG. 13.

A mounting clip 17 is slidably mounted within a guide means provided by an elongate groove 18 adjacent the rear mounting wall 3 of the circuit breaker housing. The mounting clip 17 has a rail engaging lip portion 21 extending into the fastening recess 15 and a release head portion 23 for disengaging the lip portion 21 of the mounting clip 17 from the rail 8. It will be noted that the mounting clip 17 is movable into and out of the fastening recess from an operating rail engaging position to a disengaged position. As will be particularly apparent from FIGS. 3 and 4, in the operating position the release head portion 23 of the mounting clip 17 is entirely located within the outer boundary defined by the circuit breaker housing. Thus, in the normal engaged position the mounting clip 17 is received in the circuit breaker housing. This eliminates risk of accident damage to the mounting clip 17, in use, and substantially avoids accidental disengagement of the circuit breaker from the mounting rail 8.

Referring now in particular to FIGS. 6 to 9, the mounting clip 17 includes limiting means for limiting movement of the mounting clip provided by a stop face 22 which engages a corresponding stop surface of the circuit breaker housing. The release head portion has an actuation means for moving the mounting clip 17 between the normally engaged and disengaged position provided by a hole 25 which is engaged by a tool such as a screwdriver.

The mounting clip 17 has a biasing section 28 and biasing means for urging the mounting clip 17 toward the normally engaged position is provided by a spring 29.

The elongate guide groove 18 is defined by a pair of spaced apart walls of the circuit breaker 1, provided in this case by an internal wall 30 and portion of the rear mounting wall 3. The groove 18 has a narrowed portion 32 which in use engages the spring 29 to urge the mounting clip 17 toward the normally engaged position.

The rear mounting wall portion 3 of the guide groove 18 has a cut-away portion 33 to minimise damage during handling and to facilitate insertion of the mounting clip 17 on assembly. The cut-away portion 33 further ensures an optimum strength characteristic for the mounting face 3 overcoming the risk of damage or misplacement of the mounting clip 17 during handling and assembly. The cut-away portion 33 has a stop edge 34 for engaging the stop face 22 and limiting movement of the mounting clip 17.

In use, the mounting clip 17 is passed over the cut-away portion 33 of the rear mounting wall 3 and is inserted in the guide groove 18 with the lip portion 21 extending into the fastening recess 15, the spring 29 engaging the narrowed portion 32 and the release head portion 23 available for use.

When it is required to mount the circuit breaker 1 on the rail 8 the fastening recess 16 is first engaged by the flange 10. The circuit breaker 1 is then pivoted toward the rail 8 until the flange 9 engages the fastening recess 15. The mounting clip 17 is then moved away from the engaged position (as shown in FIGS. 1, 2, 3, 11 and 12 ) in the direction of the arrow X to the disengaged position. (See FIG. 4) Movement of the mounting clip 17 is sufficient to allow the flange 9 to pass behind the lip 21, further movement of the mounting clip 17 is limited by the stop face 22 engaging the stop edge 34.

When the circuit breaker 1 is in position with the rear mounting wall 3 flush against the rail 8, the mounting clip 17 is biased by the spring 29 acting on the narrowed portion 32 and moves in the direction of the arrow Y. Movement continues until the lip 21 engages beneath the flange 9, securely mounting the circuit breaker 1 in position.

To release the circuit breaker 1 from the rail 8 a screwdriver (not shown) or any suitable substitute is inserted into the hole 25 and the mounting clip 17 is drawn along the groove 18 away from the fastening recess 15 in the direction of the arrow X. The lip 21 is thus disengaged from the flange 9 and the circuit breaker 1 released. The circuit breaker 1 is pivoted away from the rail 8 and the flange 9 disengaged from the recess 15. Pivotal movement continues until the recess 16 is disengaged from the flange 10 to fully release the circuit breaker from the rail 10.

It will be noted that a mounting clip mounted in this way ensures that the clip does not project beyond the circuit breaker boundary and the mounting clip is not therefore prone to accidental operation or damage.

Figure 15:
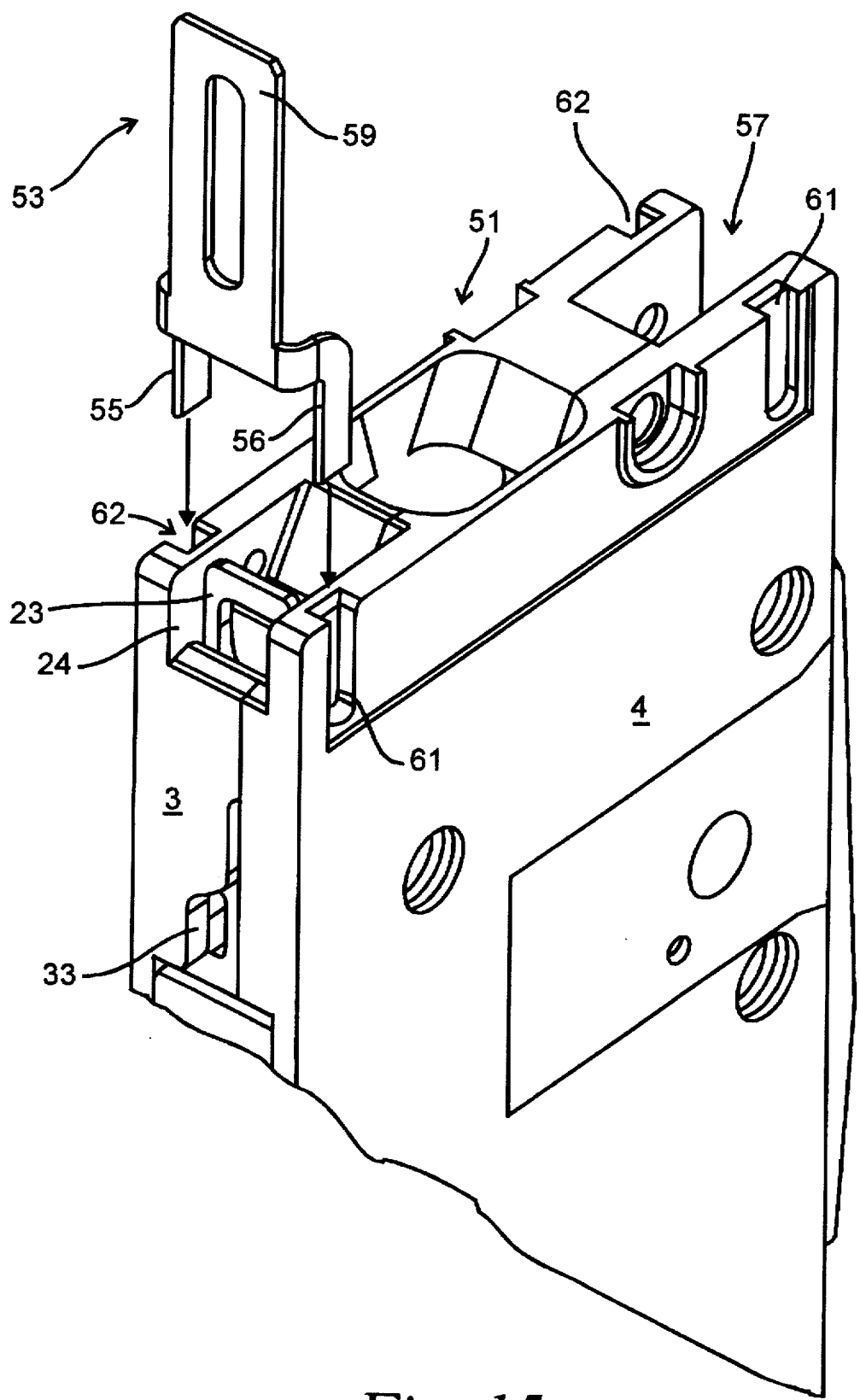
FIG. 15 is a perspective view from one side of portion of a circuit breaker according to another embodiment of the invention.
Figure 16:
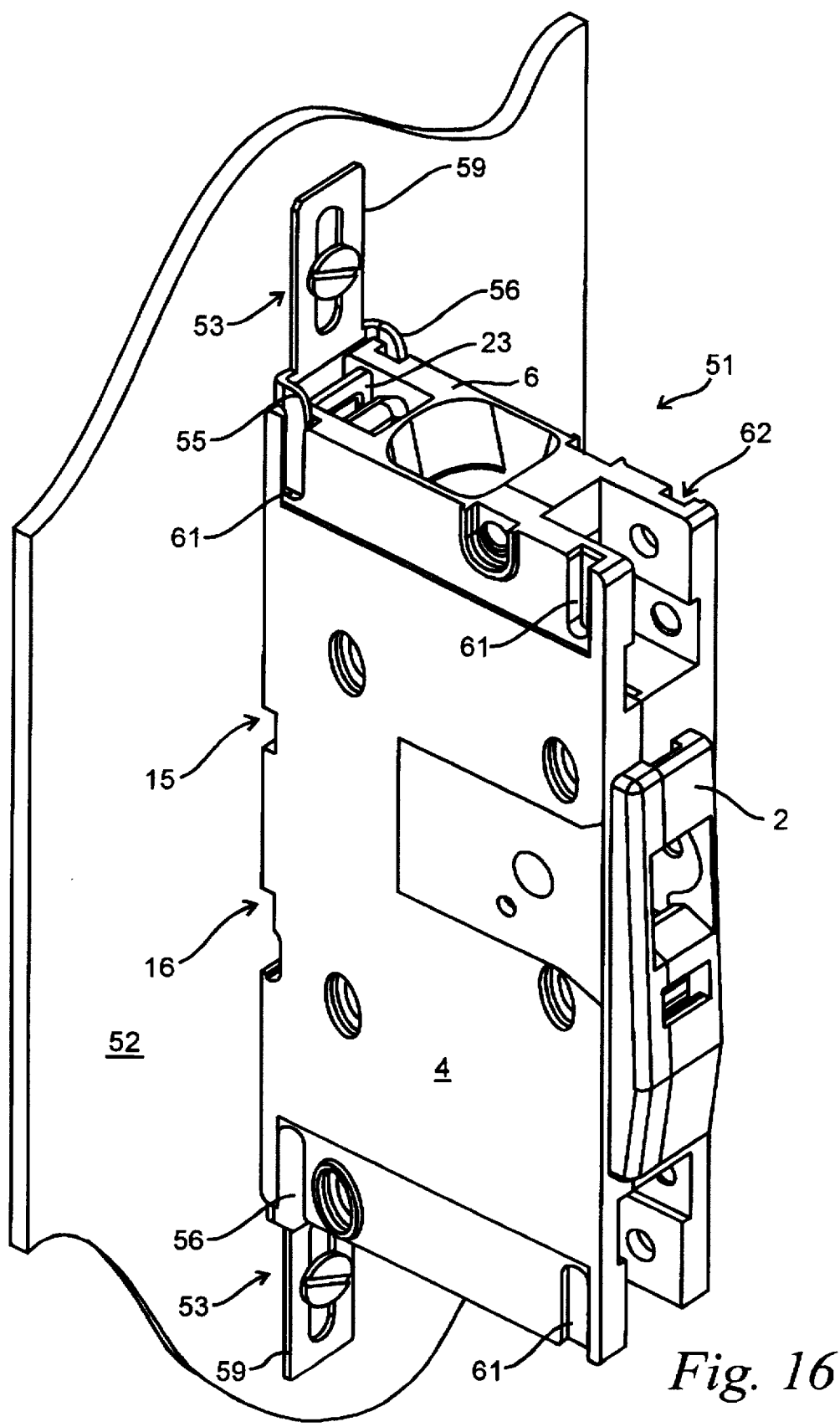
FIG. 16 is a perspective view from the rear of the circuit breaker of FIG. 15 mounted on a panel.

Referring now to FIGS. 15 and 16, there is illustrated another circuit breaker, indicated generally by the reference numeral 51 which in this case is mounted on a panel 52. Parts similar to those described with reference to FIGS. 1 to 14 are identified by the same reference numerals.

In this case, the circuit breaker 51 has an additional mounting means provided by a pair of mounting brackets 53 for mounting the circuit breaker to a panel 52. The mounting brackets 53 each have a screw retaining mounting head 59 and a pair of spaced apart engagement legs 55,56 for demountably engaging the circuit breaker. The circuit breaker 51 has a mounting recess pair 57 for receiving the engagement legs 55,56 provided by a recess 61 in the side wall 4 and a recess 62 in the side wall 5. The circuit breaker 51 has a recess pair in each corner.

In use the mounting brackets 53 are engaged on the circuit breaker 51 by slidably engaging the engagement legs 55,56 with the corresponding recesses 61,62. When engaged the circuit breaker 51 is positioned with the mounting heads 59 against the panel 52 and the screws engaged.

It will be noted that the circuit breaker may be mounted on a panel or rail by use of mounting brackets or the mounting clip without interference between the brackets and the clip.

It will be appreciated that while the embodiment described shows the mounting clip parallel to the mounting face that it may be provided at any suitable angle and with any formation of mounting clip.

It will be further appreciated that any suitable biasing method may be used to move the mounting clip from the normally engaged position to the disengaged position. It will also be noted that while the embodiment hereinbefore described uses a biasing means that the invention is not limited to this and that the clip may be secured in position, within the circuit breaker perimeter, by any other suitable mechanism, such as a force fit arrangement.

It will be appreciated that while the invention has been described with particular reference to one type of circuit breaker it has wide applications to many different types of circuit breaker.

It will also be appreciated that while the limiting means for limiting movement of the clip in this case is described with reference to the rail receiving recess it may equally be provided by a narrowed section of the guide means or by any other suitable means.

It will further be appreciated that the size and shape of the mounting clip may be varied to suit any given application.

Various changes, modifications and variations may be made to the arrangements described without departing from the scope of the invention.

What is claimed is:

1. A circuit breaker including a housing having a front wall, a rear mounting wall, a pair of side walls and a pair of end walls extending between the front and rear walls to define an outer boundary, the housing having a guide means adjacent the rear wall, the rear wall having a stop edge and at least one fastening recess for mounting on a rail, a mounting clip mounted in the guide means, the mounting clip having a rail engaging portion extending into a fastening recess and a release head portion for disengaging the clip from the rail, the mounting clip being movable into and out of the fastening recess from an operating position with the rail engaging portion engaged with the rail to a disengaged position, wherein, in the operating position, the release head portion of the mounting clip is located within the outer boundary defined by the circuit breaker housing, the mounting clip further having a stop face removably engaging the stop edge and limiting the movement of the mounting clip.

2. A circuit breaker as claimed in claim 1 wherein the release head portion of the mounting clip in the disengaged position projects outside the boundary of the circuit breaker housing.

3. A circuit breaker as claimed in claim 1 wherein the guide means is an elongate groove adjacent the rear mounting wall.

4. A circuit breaker as claimed in claim 3 wherein the groove is defined by a pair of spaced apart guide walls of the circuit breaker housing.

5. A circuit breaker as claimed in claim 4 wherein one guide wall is provided by a guide portion of the rear mounting wall of the circuit breaker housing.

6. A circuit breaker as claimed in claim 5 wherein the guide portion of the mounting wall has a cut away portion to facilitate handling of the circuit breaker and insertion of the mounting clip on assembly.

7. A circuit breaker as claimed in claim 1 wherein the mounting clip includes a biasing section having biasing means for biasing the rail engaging portion into a normal rail engaging operating position.

8. A circuit breaker as claimed in claim 7 wherein the biasing means is a spring.

9. A circuit breaker as claimed in claim 1 wherein the circuit breaker has an additional mounting means for mounting the circuit breaker on a panel.

10. A circuit breaker as claimed in claim 9 wherein the additional mounting means is provided by at least one mounting bracket.

11. A circuit breaker as claimed in claim 10 wherein the mounting bracket has a screw retaining mounting head for mounting the bracket and a pair of spaced apart engagement legs for demountably engaging the circuit breaker housing.

12. A circuit breaker as claimed in claim 11 wherein the circuit breaker housing has at least one pair of mounting recesses for receiving the engagement legs.

13. A circuit breaker as claimed in claim 12 wherein the circuit breaker housing has a pair of mounting recesses adjacent each end wall.

14. A circuit breaker comprising:

a housing having a front wall, a rear mounting wall, a pair of side walls and a pair of end walls extending between the front and rear walls to define an outer boundary, the housing having a guide means adjacent the rear wall, the rear wall having at least one fastening recess for mounting on a rail;

a bracket having a screw retaining mounting head for mounting the bracket and a pair of spaced apart engagement legs demountably engaging the housing; and a mounting clip mounted in the guide means, the mounting clip having a rail engaging portion extending into a fastening recess and a release head portion for disengaging the clip from the rail, the mounting clip being movable into and out of the fastening recess from an operating position wherein the rail engaging portion is engaged with the rail and the release head portion of the mounting clip is located within the outer boundary defined by the housing to a disengaged position wherein the rail engaging portion is disengaged with the rail.

15. A circuit breaker as claimed in claim 14 wherein the guide means is an elongate groove adjacent the rear mounting wall.

16. A circuit breaker as claimed in claim 15 wherein the groove is defined by a pair of spaced apart guide walls of the housing.

17. A circuit breaker as claimed in claim 14 wherein the mounting clip includes a biasing section having biasing means for biasing the rail engaging position into a normal rail engaging operation position.

18. A circuit breaker as claimed in claim 17 wherein the biasing means is a spring.

* * * * *